Dec. 30, 1924.
L. SAIVES
1,520,773
BRAKE FOR AUTOMOBILE VEHICLES
Filed Nov. 23, 1921    2 Sheets-Sheet 1
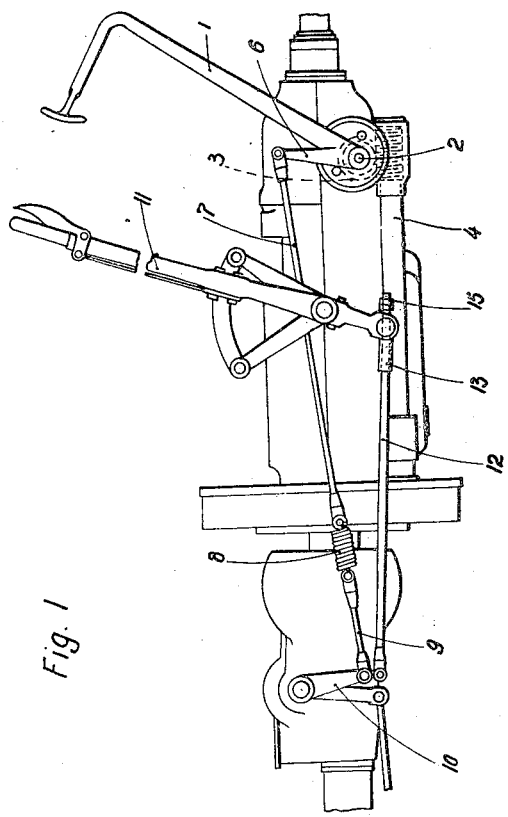
Fig. 1
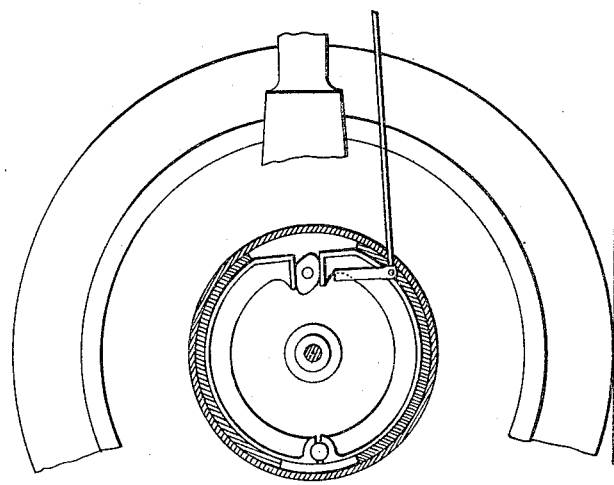
INVENTOR
Leon Saives

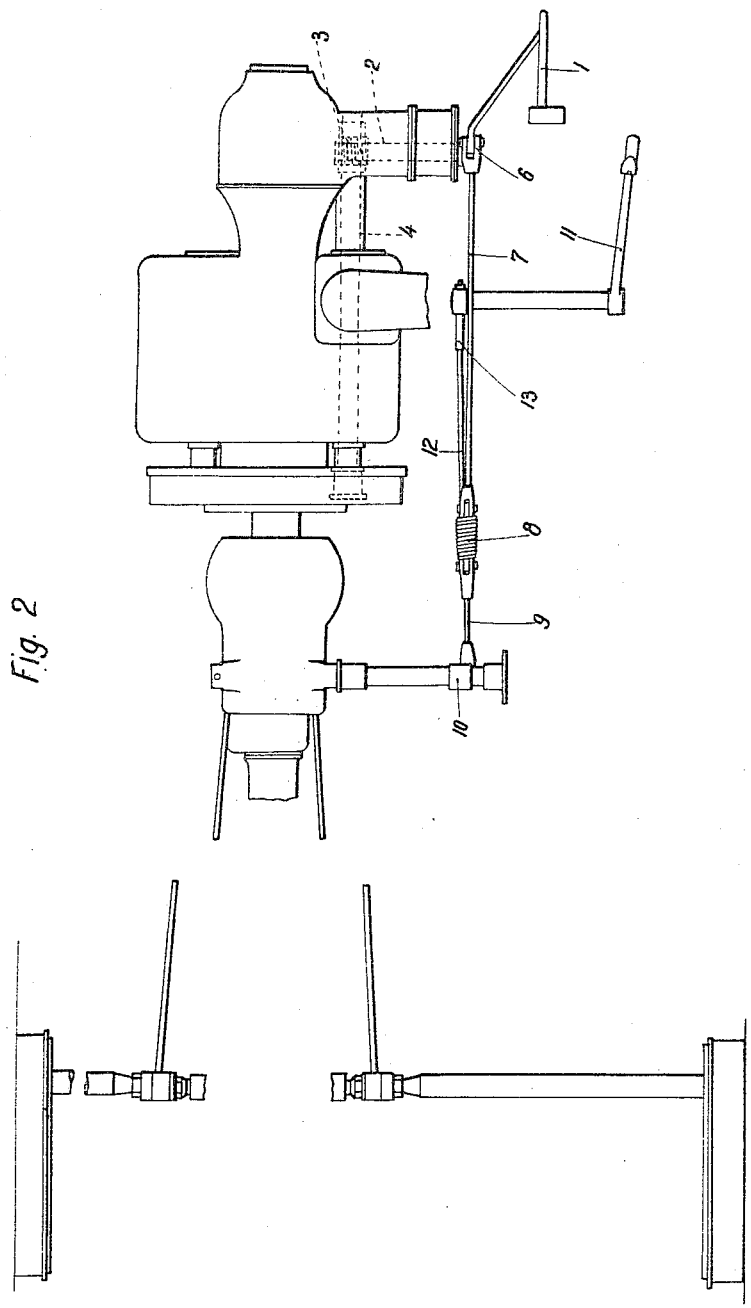

Patented Dec. 30, 1924.

1,520,773

UNITED STATES PATENT OFFICE.

LÉON SAIVES, OF BILLANCOURT, FRANCE, ASSIGNOR TO LOUIS RENAULT, OF BILLANCOURT, FRANCE.

BRAKE FOR AUTOMOBILE VEHICLES.

Application filed November 23, 1921. Serial No. 517,263.

*To all whom it may concern:*

Be it known that I, LÉON SAIVES, citizen of the French Republic, residing at Billancourt, Department of the Seine, in France, have invented certain new and useful Improvements in Brakes for Automobile Vehicles; and I do hereby declare the following to be a full, clear, and exact description of the invention, such as will enable others skilled in the art to which it appertains to make and use the same.

This invention relates to braking mechanism for automobiles which are provided with two independent brakes, one of which acts on the transmission and the other directly on the driving wheels. In vehicles so equipped, the transmission brake is ordinarily employed for service purposes, and while this has well known advantages, yet it has an objectionable feature in that disagreeable vibrations and shocks are imparted to the controlling mechanism by the vibration and more or less slackness in the transmission.

In the present invention it is proposed to eliminate to a considerable extent this objectionable feature by connecting the operating pedal of the transmission brake with the setting lever of the wheel brake, so that the operation of the pedal will simultaneously apply both brakes. In the connection between the pedal and lever is interposed a spring of a given tension so that the force applied to the operating pedal will be transmitted to the setting lever only to the value of the spring tension, the excessive force being transmitted to the transmission brake.

By employing the connection and interposed tension element between the members of the two brakes, the operating mechanism of the transmission brake is maintained under a tension that tends to lessen the vibration and jar imparted to such mechanism by the transmission. Furthermore, the tension connection is utilized in an application of the wheel brake that is auxiliary to the application of the transmission brake to effect a smoother braking action in a service application; excessive application of the wheel brake is prevented by the limitation imposed by the spring interposed in the connection.

In the accompanying drawings, which are diagrammatic and broken away in part, Fig. 1 is a side elevation of a braking mechanism embodying the invention; and Fig. 2 is a plan view of the same.

In the drawings, 1 is the pedal employed for service application of the brakes. This pedal is rigid on the shaft 2 carrying the worm 3 engaging a pinion fast on one end of the shaft 4. On the other end of the shaft is a cam for actuating the engaging members of the transmission brake. This brake and its operative mechanism is of ordinary construction and operation and need not be described in detail.

On the shaft 2 is fixed the lever 6 to be angularly displaced by the movement of the pedal 1. The lever 6 is connected by the rod member 7, the spring 8 of determined tension, and the rod member 9 with the intermediate lever 10 fast on the shaft of the mechanism for setting the wheel brakes. The shaft and mechanism controlling the wheel brakes, together with the latter, are of well known construction. The spring 8 joins the ends of the rod members 7 and 9 and the three form a connection with an interposed tension element between the levers 6 and 10. Force applied to the pedal 1 to effect a braking operation will be transmitted from the lever 6 by the loaded connection to the lever 10 to set the wheel brakes. The force so transmitted can not exceed the value of the tension element 8 and any force in excess of such limitation will be utilized in applying the transmission brake. The operation of the pedal 1 also applies the transmission brake.

The transmission and wheel brakes are applied simultaneously and the auxiliary application of the wheel brakes enhances the braking force of the transmission brake to the extent that the power is transmitted through the limiting tension element. The interposition of the tension element in the connection prevents any excessive application of the wheel brakes by the operation of the pedal 1 in a service application. A smooth and powerful service application of the brakes is obtained and at the same time the tension element, by the yielding strain exerted on the transmission braking mechanism, tends to absorb the shocks and vibration imparted to said mechanism by the engine.

The wheel brakes can also be applied, should an emergency require it, by the lever 11 pivoted to a suitable support and connected by the rod 12 with the lever 10. The rod has a sliding connection with the lever by an end extending through the socket 13 hinged to the lever and a nut 15 on its extremity. This connection permits the rod to move with the arm 10 in a service application of the brake independently of the lever 11. In an emergency application of the lever, it is moved to engage the stop 15 and further movement in the same direction will exert an operating pull on the rod 12 to apply the wheel brakes. By adjusting the nut 15 on the rod 12, the engagement of the rod by the lever 11 can be regulated.

What I claim is:

1. The combination with a transmission braking mechanism and a wheel braking mechanism, both braking mechanisms being operatively connected with a common setting member, of a tension element interposed in the connection between the setting member and the wheel braking mechanism so that the application thrust of the setting member will be transmitted through said connection only to the value of the tension member therein.

2. The combination with a transmission braking mechanism and a wheel braking mechanism, both braking mechanisms being operatively connected with a common setting pedal for service application of both brakes, of a tension element interposed in the connection between the pedal and the wheel braking mechanism so that the application thrust of the pedal will be transmitted to the wheel brake only to the value of the interposed tension element, and a lever coupled with said connection between the tension element and the wheel brake for emergency application of said wheel brake.

3. The combination with a transmission braking mechanism and a wheel braking mechanism, both braking mechanisms being operatively connected with a common setting pedal for service application of both brakes, the connection between the pedal and the wheel brake including an intermediate lever coupled by a rod and tension spring to said pedal, of a lever for emergency application of the wheel brake having a slip connection with the intermediate lever to permit actuation of said intermediate lever by the pedal irrespective of the emergency lever.

In testimony whereof I affix my signature.

LÉON SAIVES.